Patented May 3, 1927.

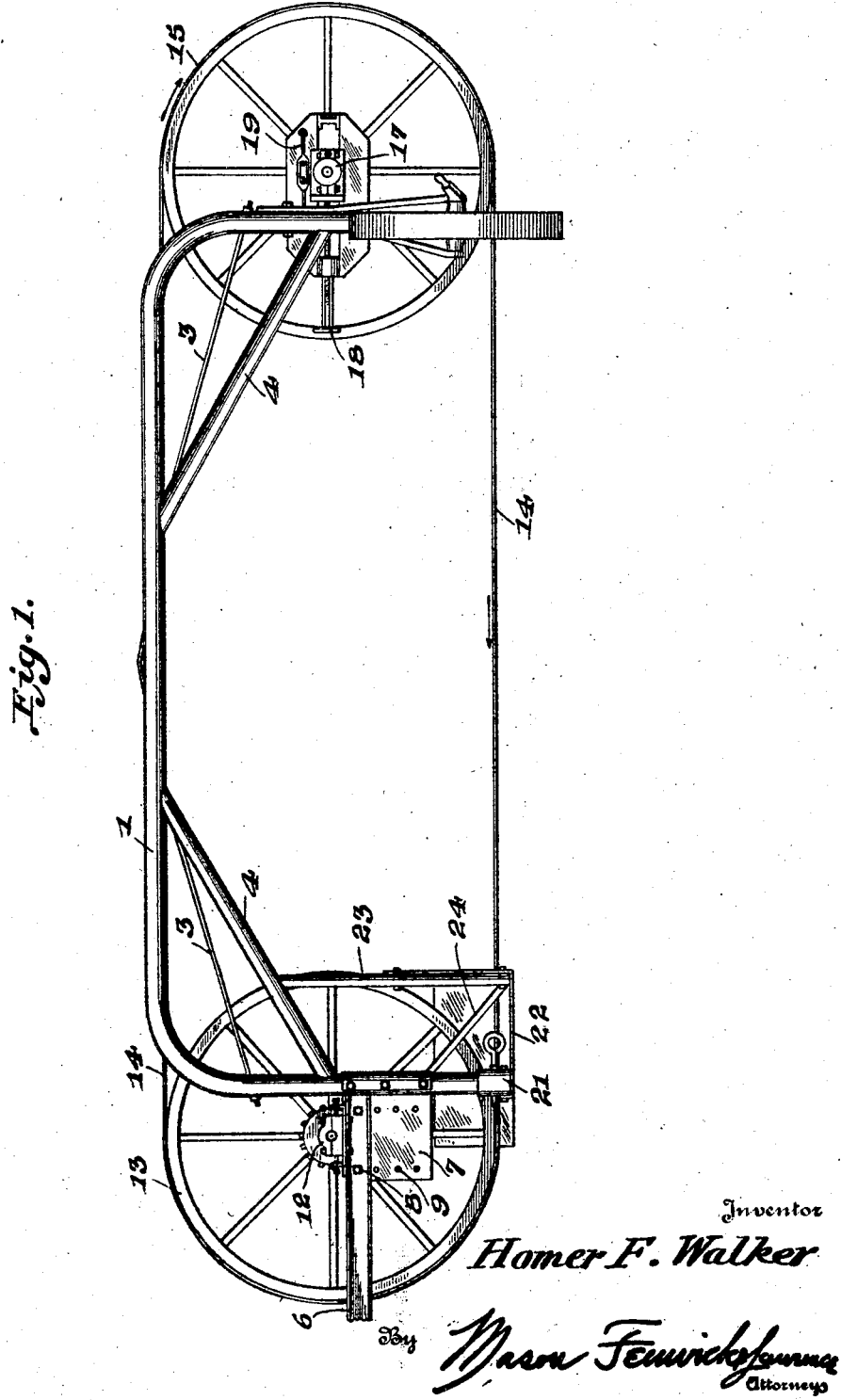

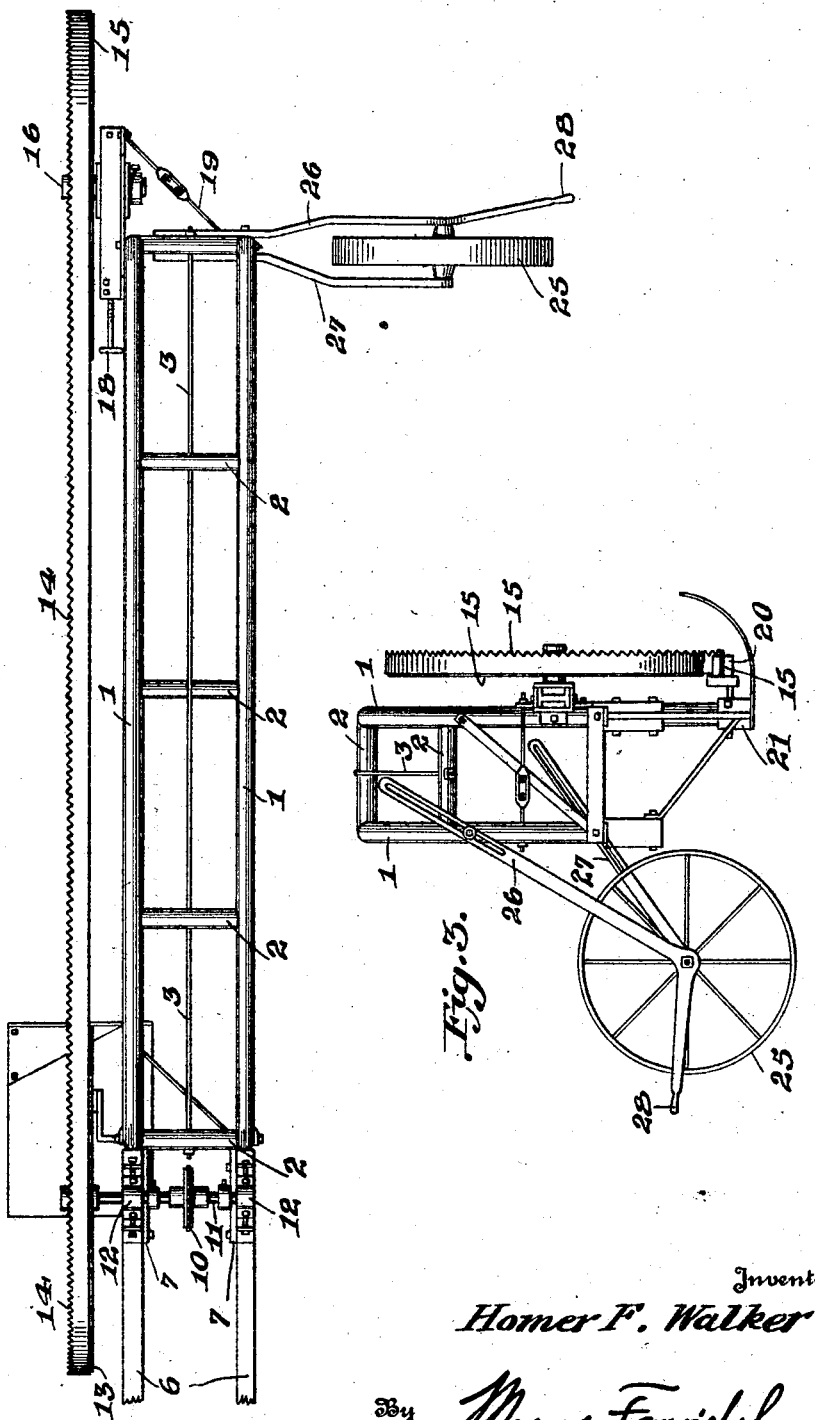

1,626,770

UNITED STATES PATENT OFFICE.

HOMER F. WALKER, OF BEAUMONT, TEXAS.

BUTT-CUTTING MACHINE.

Application filed December 18, 1925. Serial No. 76,291.

This invention relates to improvements in butt cutters, particularly to improvements in portable cutters adapted to cut or separate the butts of rice after being shocked and which becomes essential after a heavy rainfall.

A further object of this invention is to provide a portable cutting blade to sever the butts of rice or small grain and other adaptable elements such as wheat, rice, maize and the like.

A further object of this invention is to provide a butt cutting machine that may be easily connected with a suitable source of power which may be supplied by the conveyance in the nature of a vehicle and transmitted to the cutting machine by means of a chain band and sprocket wheel or otherwise.

Further objects of this invention will appear from the following detailed description of the machine and as disclosed in the two sheets of drawings herewith made a part of this application:

In the drawing,

Fig. 1 illustrates a vertical rear elevational view of the butt cutting apparatus in assembled form as detached from the conveying vehicle.

Fig. 2 represents a top view of Fig. 1.

Fig. 3 illustrates an end view of Fig. 1.

Numeral 1 designates a frame made of tubing or iron bars of suitable shape adapted to hold together the various elements of the butt cutting machine, the framework 1 being held together by braces or trusses 2 spaced as required to give the necessary strength by means of adjustable truss rods 3 and a brace 4. The frame 1 is adapted to be connected to a suitable vehicle which may transfer the butt cutting machine from place to place by means of an iron brace or bar 6 of suitable size and shape and to which the frame 1 may be attached by an adjustable connecting plate 7 by means of bolts 8 and holes 9, which will permit the raising or lowering of the machine independent of the conveying vehicle.

The source of power from which the cutting apparatus may be operated, is preferably either supplied by, or carried on the conveying vehicle, the power being transmitted therefrom to the apparatus by means of a chain band attached to a sprocket wheel 10 which is mounted on a driving shaft 11 by suitable adjustable bearings 12, the connecting bars 6 and the adjustable bearing 12 being adjustably connected to the plates 7, thereby permitting the entire end of the butt cutting machine to be raised or lowered as a unit without further adjustment, except through the holes 9 in the connecting plate 7 and the bolts 8 extending therethrough.

The shaft 11 is adapted to be suitably keyed to a drive wheel or pulley 13, on the face of which revolves an endless band saw 14 or any other suitable cutting blade, which is supported at the opposite or outer end of the apparatus by means of an adjustable wheel or pulley 15, which is mounted on a shaft 16, and rotates in an adjustable bearing 17, which may be adjusted for horizontal motion by a suitable screw 18, and for lateral movements or motions by means of an adjustable rod 19 which would function to bring the pulley 15 in exact alignment with pulley 13, during the operation of the band saw or endless cutter which is one of the prime features of this invention.

The band saw 14 is adapted to be suitably guided by means of a guide 20 and properly attached to a casting or element 21 at the extreme lower end of the frame 1. The guiding or saw guide 20 and the pulley 13, are protected by means of a shoe or fender 22 attached to the apparatus framework by means of braces 23 and 24 together with the casting element 21.

The fender 22 is adapted to prevent the entrance of straw, wheat, grass or other materials from coming in direct contact with the pulley 13. The outer end of the cutting machine may be adjustably supported by a wheel 25 attached to the frame 1 by means of slotted draft bars 26 and 27, thereby permitting the apparatus to be raised or lowered at the option of the operator by means of the slotted drive bars 26 and 27 which is further assisted by a suitable lever 28.

In operation, this invention provides a butt cutting machine that will accomplish the work of 10 or 15 men. The present method of removing the butts of rice after having been shocked, is to have laborers tear down the shocks of rice and with broad axes cut off the butts and re-shock the rice. This method is not only slow but exceedingly expensive, while the cutting apparatus as described and claimed in this invention, will cut through a shock of rice or other suitable grain expeditiously and efficiently without disturbing the shock.

It is to be understood that the power necessary for the operation of the machine may be supplied in any suitable manner, either from a source external of the machine or from a source directly attached or in combination with the machine itself.

What I claim is:

In a butt cutting machine, a driving pulley and follower, an endles cutting blade mounted on the pulley and follower, and means for securing horizontal and lateral adjustment for the cutting blade, consisting of an adjustable bearing on the follower, and an adjustment rod extending from the pulley to a suitable element on the machine, whereby the driving pulley and follower may be brought into alignment.

In testimony whereof I affix my signature.

HOMER F. WALKER.